United States Patent [19]

Morinaga

[11] Patent Number: 4,809,165
[45] Date of Patent: Feb. 28, 1989

[54] APPARATUS FOR PROCESSING INPUT/OUTPUT PULSES FOR USE IN MICROCOMPUTERS

[75] Inventor: Shigeki Morinaga, Hitachi, Japan

[73] Assignee: Hitachi, Ltd., Tokyo, Japan

[21] Appl. No.: 935,739

[22] Filed: Nov. 28, 1986

[30] Foreign Application Priority Data

Nov. 28, 1985 [JP] Japan ................ 60-267665

[51] Int. Cl.$^4$ .................. G06F 13/00; G06F 13/14
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 4,056,846 | 11/1977 | Callahan et al. | 364/200 |
| 4,109,311 | 8/1978 | Blum et al. | 364/200 |
| 4,384,324 | 5/1983 | Kim et al. | 364/200 |
| 4,415,971 | 11/1983 | Guillemet et al. | 364/200 |
| 4,450,525 | 5/1984 | Demuth et al. | 364/200 |
| 4,467,409 | 8/1984 | Potash et al. | 364/200 |
| 4,475,156 | 10/1984 | Federico et al. | 364/200 |
| 4,493,019 | 1/1985 | Kim et al. | 364/200 |
| 4,493,020 | 1/1985 | Kim et al. | 364/200 |
| 4,543,626 | 9/1985 | Bean et al. | 364/200 |
| 4,651,275 | 3/1987 | McDonough | 364/200 |

OTHER PUBLICATIONS

Schettl et al., "Centralized Interval Timer and Event Counter", IBM Tech. Disclosure Bulletin, vol. 17, No. 5, Oct. 1974, pp. 1455-1459.
Callahan et al., "Data Processor Real-Time Input/Output Channel", IBM Tech. Disclosure Bulletin, vol. 19, No. 8 Jan. 1977, pp. 3005-3011.
Motorola's MC68HC11: Definition and Design of a VLSI Microprocessor, IEEE MICRO, Feb. 1984, pp. 54-65 (Sibigtroth, J.).

Primary Examiner—Gareth D. Shaw
Assistant Examiner—Joseph T. Fitzgerald
Attorney, Agent, or Firm—Antonelli, Terry & Wands

[57] ABSTRACT

In an I/O pulse processing apparatus associated with a microcomputer, an I/O processing task is required by the microcomputer in the form of the combination of task microinstructions, each of which includes an instruction code specifying one of basic I/O processing operations and a code for specifying one or two registers necessary for executing the basic I/O processing operation. The apparatus includes an I/O task register part having a task register group consisting of plural task registers, which store the task microinstructions supplied from the microcomputer and necessary for executing the task required thereby, and a task signal generator for producing address signals for the task register group, according to which the task microinstructions are read out successively from the task register group. There is further provided an I/O operation part including a register group comprising plural registers, each of which is capable of being specified by a task microinstruction and performing a register function necessary for completion of the basic I/O processing operation specified by the instruction code of the task microinstruction, and an arithmetic unit connected to the register group to perform an arithmetic operation on the basis of data from the specified registers in accordance with control signals produced by decoding the task microinstruction.

7 Claims, 7 Drawing Sheets

(a) CONTENT OF COUNTER/TIMER REGISTER (b) EXTERNAL CLOCK

FIG. 4

(a) CONTENT OF COUNTER/TIMER REGISTER (b) EXTERNAL CLOCK (c) GATE CONTROL SIGNAL

FIG. 5

(a) CONTENT OF COUNTER/TIMER REGISTER (b) EXTERNAL CLOCK (c) UP/DOWN CONTROL SIGNAL

FIG. 6

NOTE:
PRECHARGE  DISCHARGE

FIG. 7

(a) CONTENT OF COUNTER/TIMER REGISTER (b) RESET SIGNAL

→ TIME

FIG. 8

(a) φ1
(b) φ2
(c) RBUS1
(d) SLX
(e) AUS
(f) DL
(g) WBUS
(h) CNT
(i) RST

FIG. 9

(a) CONTENTS OF COUNTER/TIMER REG. & CAPTURE REG.

COUNTER/TIMER REG.

CAPTURE REG.

(b) SAMPLING SIGNAL

→ TIME

FIG. 10

(a) CONTENTS OF COUNTER/TIMER REG. & COMPARE REG.

(b) OUTPUT SIGNAL

(a) CONTENTS OF COUNTER/TIMER REG. & COMPARE REG.
(b) EXTERNAL CLOCK
(c) RESET SIGNAL
(d) OUTPUT SIGNAL

| TASK | 0 | | 2 | 3 | | | 6 | 7 | | | 10 | 11 | | | 14 | 15 | | | 18 |
|---|---|---|---|---|---|---|---|---|---|---|---|---|---|---|---|---|---|---|---|---|
| #0 | 0 | 0 | 1 | 0 | 0 | 0 | 0 | X | X | X | X | 0 | 0 | 0 | 0 | X | X | X | X |
| #1 | 1 | 0 | 0 | 0 | 0 | 0 | 0 | X | X | X | X | X | X | X | 0 | 0 | 0 | 0 | 1 |
| #2 | 1 | 1 | 0 | 0 | 0 | 0 | 0 | 0 | 0 | 1 | X | X | X | X | 0 | 0 | 1 | 0 |
| #3 | 0 | 1 | 0 | 0 | 0 | 1 | 0 | X | X | X | X | 0 | 0 | 1 | 1 | 0 | 1 | 0 | 0 |
| #15 | 1 | 0 | 1 | 0 | 1 | 0 | 0 | 0 | 1 | 0 | 1 | X | X | X | X | 0 | 1 | 1 | 0 |

APPARATUS FOR PROCESSING INPUT/OUTPUT PULSES FOR USE IN MICROCOMPUTERS

BACKGROUND OF THE INVENTION

1. Field of the Invention

The present invention relates to an apparatus for processing input/output pulses to and from a microcomputer, particularly to a flexible input/output pulse processing apparatus suitable for use in a microcomputer for controlling various devices or apparatuses.

2. Description of the Related Prior Art

A typical example of conventional apparatus for processing input/output pulses (called an I/O pulse processing apparatus, hereinafter), especially a counter/timer, incorporated in a microprocessor is discussed in an article titled "Motorola's MC68HC11: Definition and Design of a VLSI Microprocessor" by James M. Sibigtroth (IEEE MICRO, February, 1984). The single-chip microprocessor discussed in the above article has an excellent function. However, in this microprocessor, especially in the I/O pulse processing apparatus associated with the microprocessor, the number of counter/timer registers, the number of capture registers each for holding the number of input pulses, and the number of compare registers each for determining the pulse width of a pulse output are all fixed. Moreover, the functions of these registers as well as the combination of counter/timer registers and capture or compare registers are fixed. Accordingly, in the case where the microprocessor is applied to the control of various devices or apparatuses, the counter/timer part of the I/O pulse processing apparatus will be deficient in selection of registers. Further, as to the arrangement of I/O pins as I/O terminals, only the output terminal of a specified counter/timer register can be selected from a plurality of terminals, but other terminals are fixed. Specifically, in a single-chip microprocessor, the number of I/O terminals is limited and hence it is desirable to be able to freely change the connection between counter/timer registers and I/O terminals.

In order to realize an I/O pulse processing apparatus suitable for controlling various devices or apparatuses by a microcomputer, the inventors have proposed an apparatus as disclosed in U.S. application Ser. No. 793,350 filed on Oct. 31, 1985, in which the numbers of counter/timer registers, capture registers and compare registers are freely determined and the connection between registers and I/O terminals (pins) can be arbitrarily changed. In the apparatus, however, since a task required for the I/O pulse processing apparatus must be instructed by a microcomputer associated therewith concretely and specifically to a great extent, the manner or form of I/O processings was not easy to be amended. Namely, it was limited to the manner or form prepared in advance, and therefore the flexibility of the apparatus was considerably poor.

SUMMARY OF THE INVENTION

An object of the present invention is to provide an I/O pulse processing apparatus associated with a microcomputer, in which the numbers of counter/timer registers, capture registers and compare registers are freely determined, and by which a flexible apparatus can be realized.

According to one of the features of the present invention, the task is required by the microcomputer to be in the form of a combination of selected task microinstructions, each of which includes an instruction code specifying one of a plurality of basic I/O processing operations and a code for specifying at least one register necessary for executing the specified basic I/O processing operation. The I/O pulse processing apparatus includes an I/O task register device having a task register group consisting of a plurality of task registers, which store the task microinstructions supplied from the microcomputer and necessary for executing the task required by the microcomputer, and a task signal generator for producing address signals for the task register group, according to which the task microinstructions are read out successively from the task register group to complete the task required by the microcomputer. The successively read-out task microinstructions are decoded in a task decoding device connected to the I/O task register device to produce control signals. There is further provided an I/O operation device including a register group made up of a plurality of registers, each of which is capable of being specified by a task microinstruction and performing a register function necessary for completion of the basic I/O processing operation specified by the instruction code of the task microinstruction, and an arithmetic unit connected to the register group through buses for performing an arithmetic operation on the basis of data from the specified registers in accordance with the control signals produced by decoding the task microinstruction in the task decoding means.

Other objects and features of the present invention will become apparent upon reading the specification and inspection of the drawings and will be particularly pointed out in the claims.

DESCRIPTION OF THE PREFERRED EMBODIMENT

Figure 1:
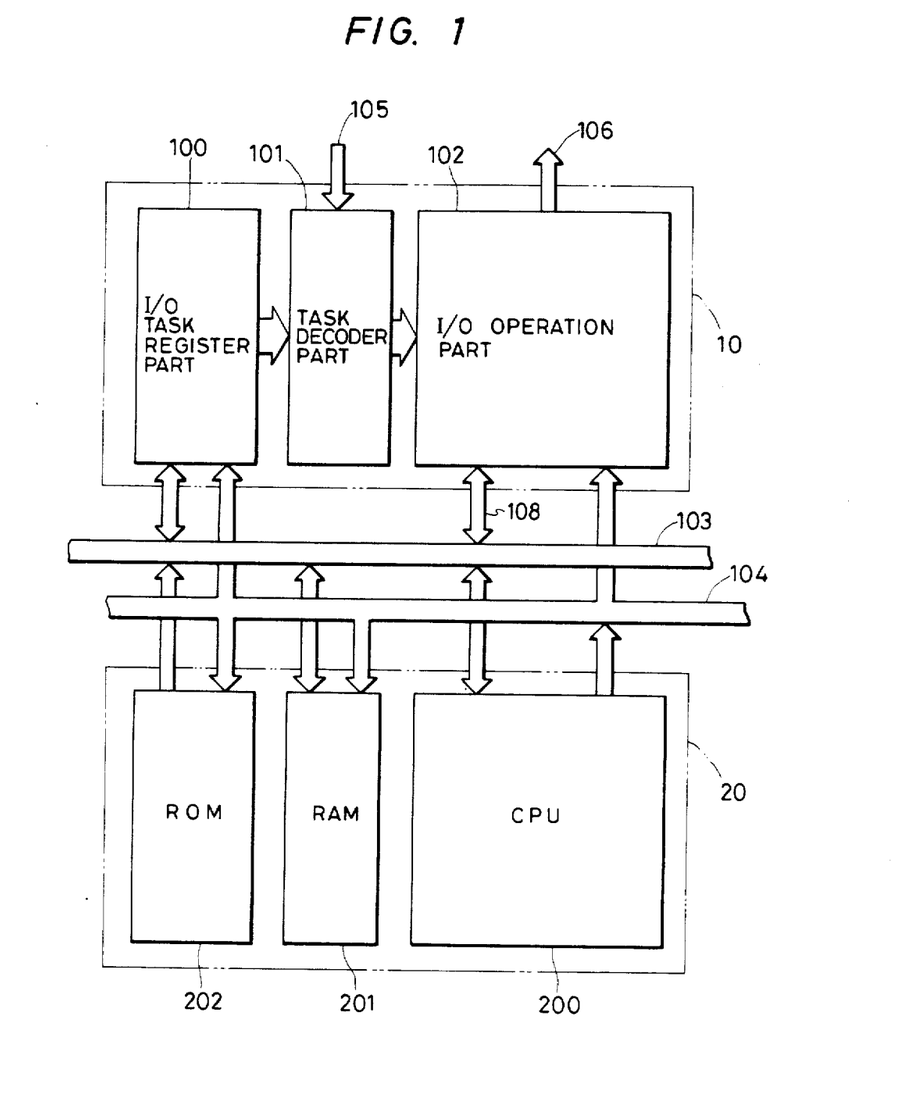
FIG. 1 is a block diagram showing an example of a microcomputer system with an I/O pulse processing apparatus according to the present invention.

FIG. 1 shows the outline of an example of a single-chip microcomputer system having a microcomputer unit 20 and an I/O pulse processing apparatus 10, to which the present invention is applied.

Referring to the figure, the microcomputer unit 20 is made up of a central processing unit (CPU) 200, a random access memory (RAM) 201 serving as a data storage part and a read-only memory (ROM) 202 serving as a program storage part. These constituent parts are connected through a data bus 103 and an address/control bus 104. Since the thus constructed microcomputer unit 20 is known, the further description is omitted here.

The I/O pulse processing apparatus 10 is coupled to the microcomputer unit 20 through the buses 103 and 104. The processing apparatus 10 comprises an I/O task register part 100, a task decoder part 101 and an I/O operation part 102. Although details of the constituent parts thereof will be described later, the processing apparatus 10 communicates data with external devices or apparatus through an input terminal group 105 and an output terminal group 106, and with the microcomputer unit 20 through an I/O terminal group 108 and the data bus 103.

Further, it is to be noted that, when viewed from the I/O pulse processing apparatus 10, the microcomputer unit 10 is also regarded as one of the external devices or apparatuses. In the following, therefore, signals which are sent to the processing apparatus 10 from the microcomputer unit 20 are treated as external signals; for example, a clock pulse sent from the unit 20 is called an external clock pulse, distinguished from an internal clock pulse generated and used in the I/O pulse processing apparatus 10.

Figure 2:
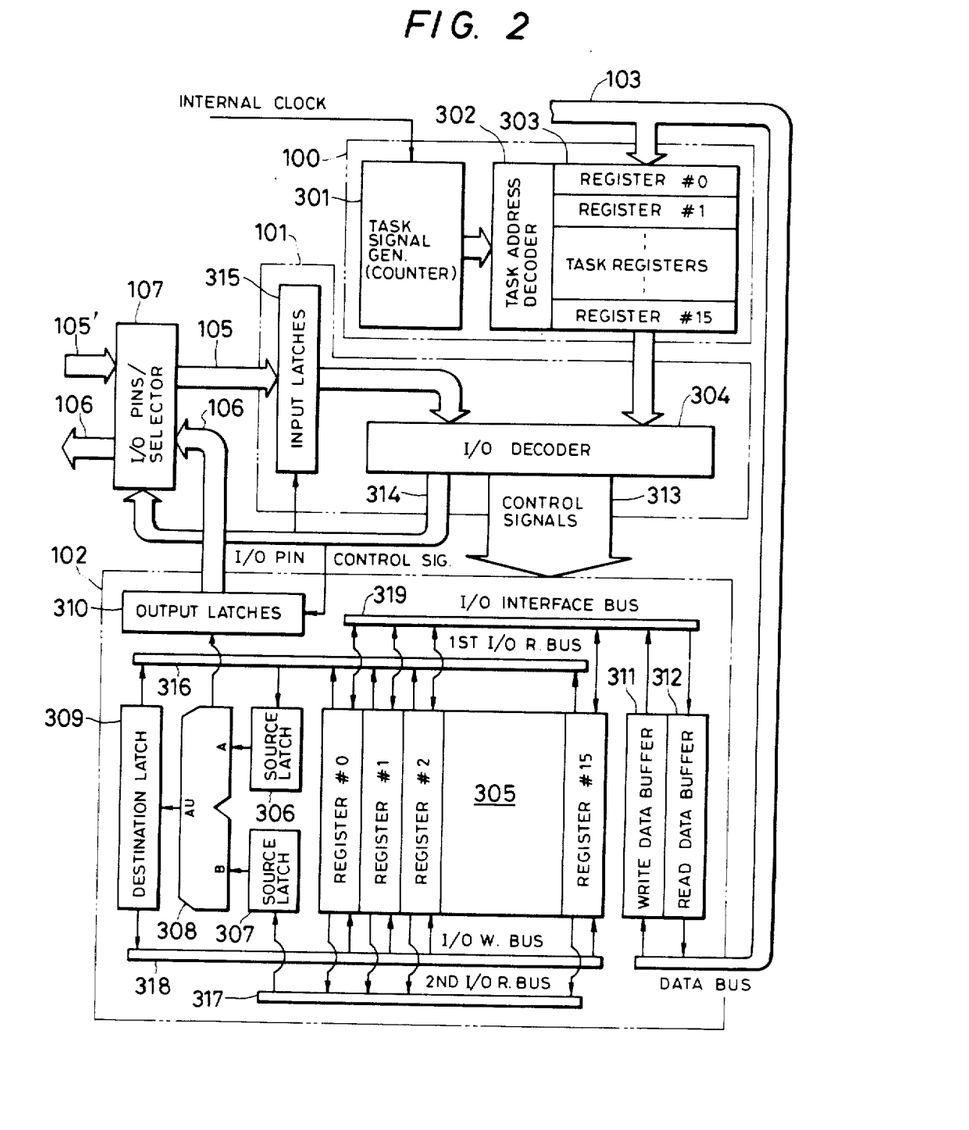
FIG. 2 is a block diagram showing an I/O pulse processing apparatus according to an embodiment of the present invention, which is included in the microcomputer system of FIG. 1.

Referring next to FIG. 2, the description will be made of the detailed construction of the I/O pulse processing apparatus 10 according to a preferred embodiment of the present invention.

The I/O task register part 100 includes an I/O task signal generator 301 which is formed by a counter operating under internal clock pulses, a task address decoder 302 and a task register group 303 which is made up of sixteen task registers in the present embodiment. The signal generator 301 counts the internal clock pulses to produce an address signal for read out of necessary data from the task register group 303. The address signal is decoded by the task address decoder 302 to get access to the task register group 303. The task register group 303 stores task microinstructions fetched from the microcomputer unit 20 through the data bus 103.

A task microinstruction will be described in detail later. Briefly speaking, a task microinstruction causes an I/O pulse processing apparatus to perform a particular one of basic I/O processing operations, which are referred to later. A task required for an I/O pulse processing apparatus by a microcomputer unit is usually completed by the combination of some kind of task microinstructions. Therefore, the combination and sequence of the task microinstructions to be executed in the I/O pulse processing apparatus are determined by the microcomputer unit in accordance with the task the microcomputer unit expects from the I/O pulse processing apparatus. Further, a set of the task microinstructions necessary for completing the task are fetched into the task register group 303 during the initialization of the microcomputer unit 20.

The task decoder part 101 decodes task microinstructions successively read out from the task register group 303 and produces control signals 313 and an I/O pin (terminal) control signal 314 on the basis of a signal 105 given through input latches 315. The control signals 313 controls the operating mode and sequence of constituent elements of the I/O operation part 102 in synchronism with the internal clock pulse. The I/O pin control signal 314 controls an I/O pin selector 107 as well as the input latches 315 and output latches 310 and specifies I/O pins 107 and latches 315, 310 to be employed in the I/O pulse processing operation of the decoded task microinstructions.

The I/O operation part 102 includes a register group 305 which, in the present embodiment, is formed of sixteen registers each capable of being specified as a desired one of a counter/timer register, a capture register and a compare register by a task microinstruction. A register, which is specified as a counter/timer, counts external or internal clock pulses (the register is called a counter, when it counts the external clock pulses, and called a timer, when it counts the internal clock pulses). A register, which is specified as a capture register, stores data transferred from a register specified as a counter/timer, when a sampling signal occurs. A register, which is specified as a compare register, stores a reference data to be compared with the content of a register specified as a counter/timer.

There are further provided in the I/O operation part 102 first and a second source latches 306 and 307 for temporarily storing data read out from the register group 305 through a first I/O read bus 316 and a second I/O read bus 317, respectively. The contents of the latches 306 and 307 are supplied to terminals A and B of an arithmetic unit (AU) 308, respectively, which performs arithmetic operations such as increment or decrement operation, comparing operation and so on. A destination latch 309 receives the result of the arithmetic operation of the AU 308, and sends it out to the first source latch 306 through the bus 316 or to the register group 305 through an I/O write bus 318. The output latches 310, which has been already referred to, receives the result of the comparing operation of the AU 308 to supply it to the I/O pin selector 107 as the output 106. The I/O operation part 102 is further provided with a write data buffer 311 for receiving data transferred through the data bus 103 to write the data in the register group 305 through an I/O interface bus 319, and a read data buffer 312 for receiving data read out from the register group 305 through the bus 319 to supply the data to the bus 103.

The thus constructed I/O pulse processing apparatus 10 is required to perform many different types of I/O processing operations, when it is associated with the microcomputer unit 20 for controlling various kinds of devices or apparatuses. In such a case, a task instruction, which has the processing apparatus 10 perform a certain type of I/O processing operation for a particular control, may be useless for many other types of I/O processing operations, if the task instruction is too specific to the I/O processing operation. Namely, use of the task instruction is limited only to performance of a certain type of processing operation in a particular control, and the flexibility is greatly lost.

The inventors have analyzed the operational function necessary for an I/O pulse processing apparatus, which can be used for a general purpose, and divided it into several basic I/O processing operations. A complicated I/O processing operation, which is required by a microcomputer in usual control operations, can be completed by performing properly selected basic I/O processing operations. In the following, the explanation will be given on such basic I/O processing operations.

Figure 3:
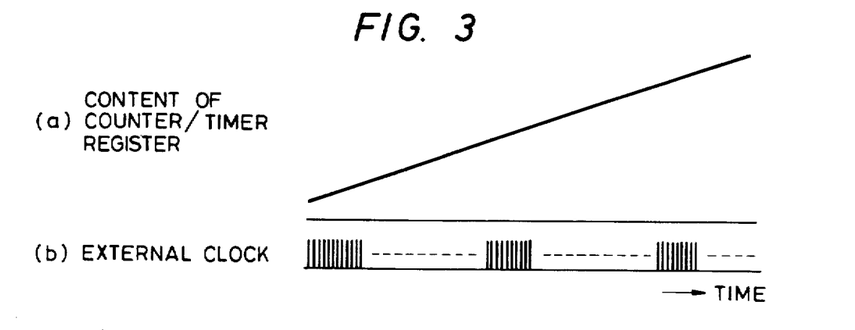
FIG. 3 is a diagram for explaining the operation of a free running counter/timer processing (FRC) as an example of basic I/O processing operations.

Referring at first to FIG. 3, there is shown the outline of the operation of a free running counter/timer processing operation (FRC). As apparent from the figure, in this processing operation, a register of the register group 305, which is specified by a task microinstruction as a counter/timer register, counts up clock pulses applied thereto to continuously increase its content. FIG. 3 shows the case where the external clock pulses are counted. The operational timing of this processing operation is shown in the part (I) of FIG. 6. With reference to the figure, the operation of the processing apparatus 10 in this processing operation will be explained in the following.

Figure 6:
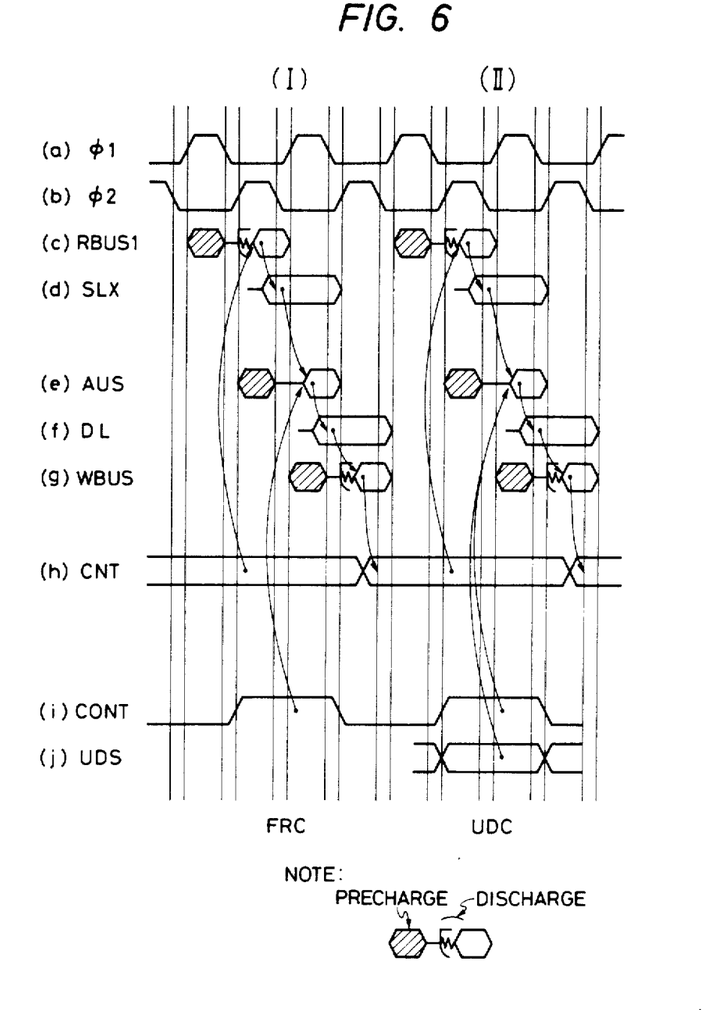
FIG. 6 is a timing chart showing the operational timing of the FRC processing of FIG. 3 and the UDC processing of FIG. 5.

The operation of the processing apparatus 10 is timed to internal clocks $\phi 1$ and $\phi 2$, which have the phase difference of 180° and no overlap, as shown in FIGS. 6(a) and (b). During $\phi 1$ assumes "1", the bus 316 is precharged (cf. FIG. 6(c) RBUS1), and when $\phi 2$ becomes "1", the bus 316 is discharged in accordance with the content CNT (cf. FIG. 6(h)) of the specified counter/timer register (cf. FIG. 6(c) RBUS1). When the discharge is completed, the data RBUS1 is established on the bus 316, i.e., the data CNT stored in the specified counter/timer register of the register group 305 is read out to become the data RBUS1 on the bus 316, during the period, in which $\phi 2$ is "1".

During the same period, the data RBUS1 on the bus 316 is taken into the first source latch 306 (cf. FIG. 6(d) SLX). The AU 308, which is in the precharged state during $\phi 2$ assumes "1", receives the data SLX (cf. FIG. 6(e) AUS) and increases it, when a count signal CONT, which is obtained by synchronizing the external clock with the internal clock $\phi 2$, assumes "1" (cf. FIG. 6(i)). The result of the increment operation of the AU 308 is held by the destination latch 309, during $\phi 1$ is "1" (cf. FIG. 6(f) DL).

The I/O write bus 318, which is in the precharge state during $\phi 1$ assumes "1", is discharged in accordance with the data DL of the destination latch 309, when $\phi 2$ assumes "1". Namely, the content DL of the destination latch 309 is read out to become the data WBUS on the bus 318 (cf. FIG. 6(g)). The data WBUS on the bus 318 is written into the specified counter/timer register again, when $\phi 2$ is "1", whereby the content CNT of the specified counter/timer register is renewed by the increased data.

As described above, a register of the register group 305, which is specified by a task microinstruction as a counter/timer register, functions as a free running up-counter. In the similar manner, such a register can be also operated as a free running down counter. In this case, however, the AU 308 has to perform the decrement operation.

Figure 4:
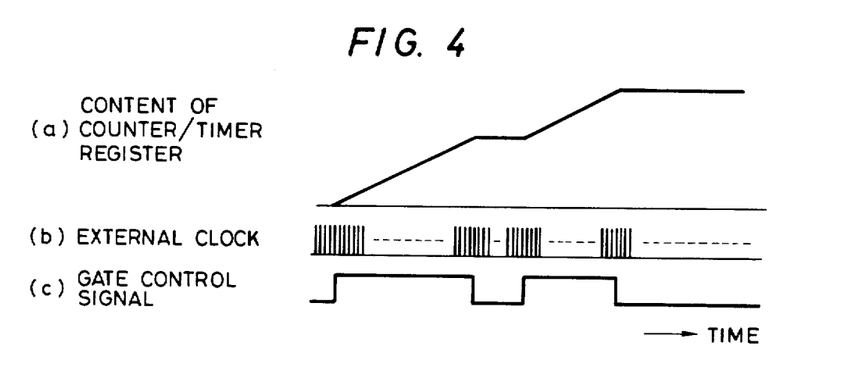
FIG. 4 is a diagram for explaining the operation of a gate controlled counter/timer processing (GCC) as another example of the basic I/O processing operations.

FIG. 4 shows the outline of the operation of a gate controlled counter/timer processing operation (GCC). In the same way as the aforesaid FRC, a register of the register group 305, which is specified by a task microinstruction as a counter/timer register, counts up the external clock to increase its content. In the GCC processing operation, however, the counting operation is continued only when a gate control signal exists. To this end, synchronized count pulses, which are counted by the specified counter/timer register, are created by a logical "AND" of the external clock and the gate control signal. The gate control signal is externally given through one of the I/O pins 107, which is specified by the task microinstruction. The operational timing of GCC is the same as that of FRC as explained above referring to the part (I) of FIG. 6, except the control by the gate control signal. Therefore, further description thereof is omitted.

Figure 5:
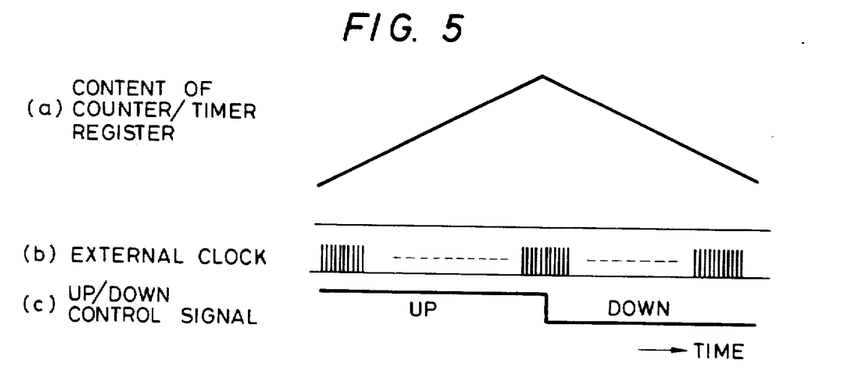
FIG. 5 is a diagram for explaining the operation of an up-down counter/timer processing (UDC) as still another example of the basic I/O processing operations.

In FIG. 5, there is shown the outline of the operation of an up-down counter/timer processing operation (UDC). As apparent from the figure, in this processing, a register, which is specified by a task microinstruction as a counter/timer register, counts up or down the clock to increase or decrease its content, in response to an up/down control signal, which is given externally through one of the I/O pins 107 specified by the task microinstruction. As shown in the part (II) of FIG. 6, the operational timing of UDC is almost the same as that of FRC shown in the part (I) of the same. In the UDC processing operation, however, the AU 308 is controlled by a synchronized up/down control signal UDS (cf. FIG. 6(j)) as well as the count signal CONT as shown in FIG. 6 (i). The synchronized up/down control signal is obtained by synchronizing the external up/down control signal with the internal clock $\phi 2$.

Figure 7:
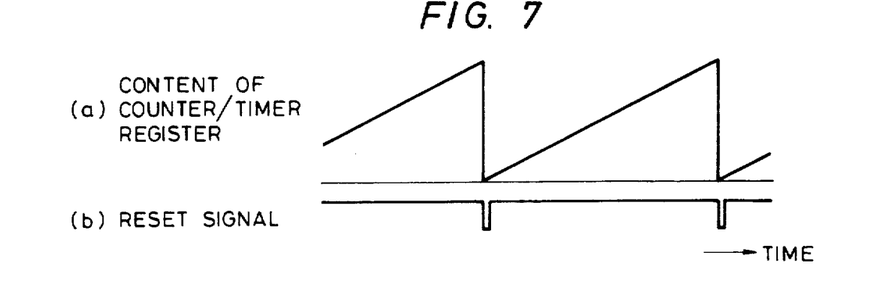
FIG. 7 is a diagram for explaining the operation of a reset processing (RES) as still another example of the basic I/O processing operations.

Referring next to FIG. 7, there is shown the outline of the operation of a reset processing operation (RES), in which a register of the register group 305, which is specified by a task microinstruction as a counter/timer register, is reset by an external reset signal. The operation of this processing operation will be explained, referring to FIG. 8, in which the operational timing is shown.

Figure 8:
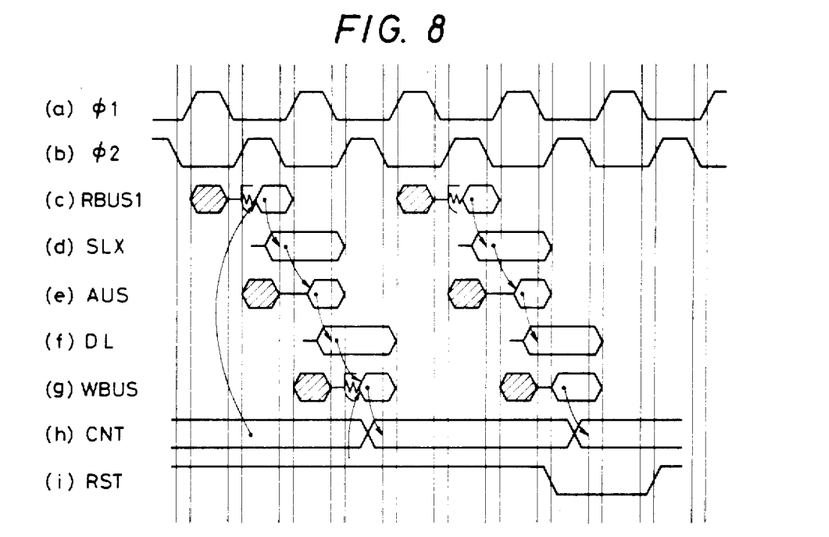
FIG. 8 is a timing chart showing the operational timing of the RES processing of FIG. 7.

At first, the explanation is given of the operation in the case where no external reset signal exists. In this embodiment, when no external reset signal exists, a synchronized reset signal, which is obtained by synchronizing the external reset signal with the internal clock $\phi 2$, becomes high, i.e., the logical value thereof is "1" (cf. FIG. 8(i) RST). The first I/O read bus 316, which is precharged during $\phi 1$ assumes "1", is discharged in accordance with the content CNT (cf. FIG. 8(h)) of the specified counter/timer register, during $\phi 2$ assumes "1" (cf. FIG. 8(c)). When the discharge is completed, the data RBUS1 is established on the bus 316. Then, the data RBUS1 is taken into the first source latch 306 to become the data SLX, during $\phi 2$ is "1" (cf. FIG. 8(d)).

The AU 308 is in the precharge state during $\phi 2$ assumes "1" (cf. FIG. 8(e) AUS), however the data SLX of the first source latch 306 passes through the AU 308 without being subjected to any processing due to no existence of the external reset signal. The data passing through the AU 308 is held by the destination latch 309 to become the data DL, during $\phi 1$ assumes "1" (cf. FIG. 8(f)). The I/O write bus 318, which is precharged during $\phi 1$ assumes "1", is discharged in accordance with the content DL of the destination latch 309, during $\phi2$ assumes "1" (cf. FIG. 8(g) WBUS). Upon completion of the discharge, the data WBUS is established on the bus 318 (cf. FIG. 8(g)), that is, the content DL of the destination latch 309 is read out to become the data WBUS on the bus 318. The data WBUS on the bus 318 is taken into the specified counter/timer register again, when $\phi2$ assumes "1" (cf. FIG. 8(h)). In this case, the data, which is written into the specified counter/timer register again, is the same as the previous data, because, as already described, the data read out from the specified counter/timer register have not been subjected to any processing in the AU 308.

Next, the explanation will be made of the operation in the case where the external reset signal exists. In this case, the synchronized reset signal assumes the low state (cf. FIG. 8(i) RST). The operation is the same as the case of nonexistence of the reset signal, until the data AUS of the AU 308 is transferred to the destination latch 309 to become the data DL. If, however, the reset signal exists, the I/O write bus 318, which is precharged during $\phi1$ assumes "1", is not discharged in accordance with the content DL of the destination latch 309, whereas the bus 318 was discharged in the case of nonexistence of the reset signal. The precharged data of the bus 318 is written into the specified counter/timer register in the register group 305. The precharged data of the bus 318 becomes a reset data, by which the content of the specified counter/timer register is renewed. It means the reset of the specified counter/timer register that its content is renewed by the reset data.

Figure 9:
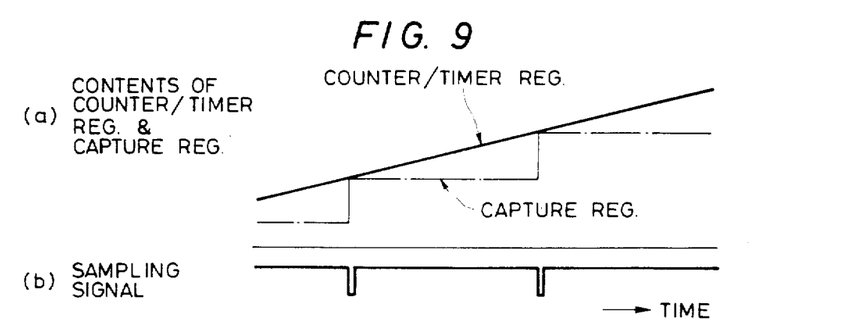
FIG. 9 is a diagram for explaining the operation of a capture processing (CPT) as another example of the basic I/O processing operations.

In FIG. 9, there is shown the outline of the operation of a capture processing operation (CPT), by which every time sampling signals occur (cf. FIG. 9(b)), the content of a register of the register group 305 specified by a task microinstruction as a counter/timer register is held by another register of the register group 305 specified by another task microinstruction as a capture register (cf. FIG. 9(a)). Referring to the part (I) of FIG. 11, the operation of CPT will be explained hereinbelow.

Figure 11:
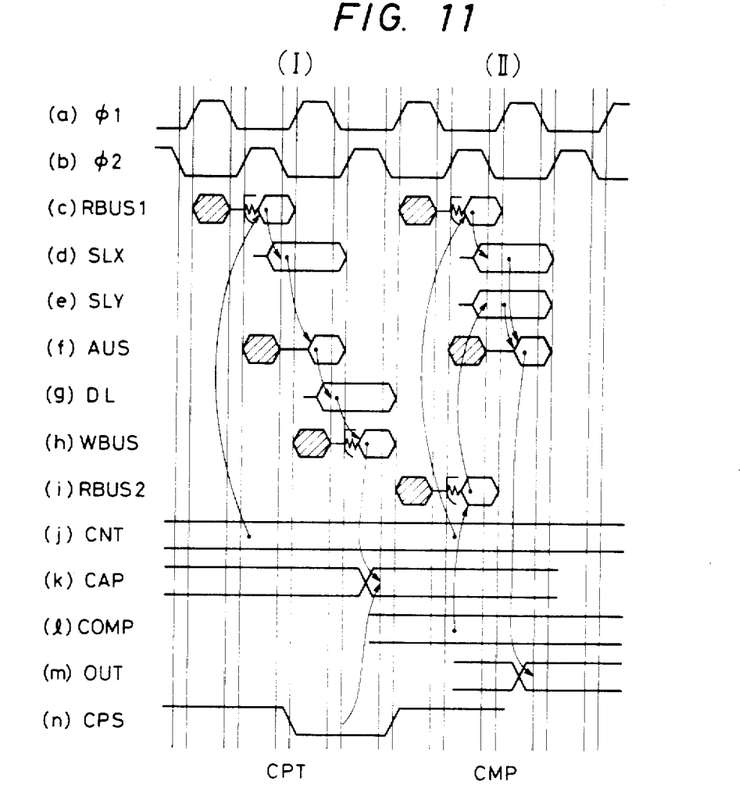
FIG. 11 is a timing chart showing the operational timing of the CPT processing of FIG. 9 and the CMP processing of FIG. 10.

The operation of this operation is the same as that described above with reference to FIGS. 6 and 8, until the data CNT (cf. FIG. 11(j)) stored in the specified counter/timer register is transferred into the first source latch 306 through the first I/O write bus 316 to become the data SLX (cf. FIGS. 11(c) and (d)). After that, although the data SLX is taken into the AU 308, which is precharged during $\phi2$ assumes "1" (cf. FIG. 1(f)), it passes through the AU 308 without being subjected to any processing therein and is received by the destination latch 309 to become the data DL, during $\phi1$ assumes "1" (cf. FIG. 11(g)).

The I/O write bus 318, which is precharged during $\phi1$ assumes "1", is discharged in accordance with the content DL of the destination latch 309, during $\phi2$ assumes "1". When the discharge is completed, the data is established on the bus 318 to become the data WBUS (cf. FIG. 11(h)). At that time, if a synchronized capture signal CPS exists (logically "0", cf. FIG. 11(n)), the data WBUS is written into a register of the register group 305 specified as the capture register, during $\phi2$ assumes "1" (cf. FIG. 11(k)). The aforesaid synchronized capture signal CPS can be obtained by synchronizing the sampling signal with the internal clock $\phi2$. As described above, the content of the specified counter/timer register at the time when the sampling signal occurs is held by the specified capture register.

Figure 10:
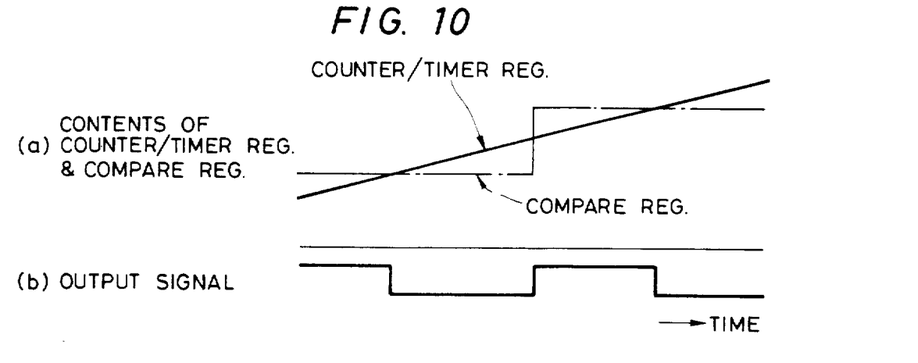
FIG. 10 is a diagram for explaining the operation of a compare processing (CMP) as still another example of the basic I/O processing operations.

Referring to FIG. 10, there is shown the outline of the operation of a compare processing operation (CMP). As apparent from the figure, in this processing operation, the content of a register of the register group 305 specified by a task microinstruction as a counter/timer register is compared with the content of another register of the register group 305 specified by another task microinstruction as a compare register (cf. FIG. 10(a)), and an output signal is produced on the basis of the result of the comparison (cf. FIG. 10(b)).

The operational timing of this processing operation is shown in the part (II) of FIG. 11. During $\phi1$ assumes "1", the first and the second I/O read buses 316 and 317 are precharged (cf. FIGS. 11(c) and (i)). When $\phi2$ becomes "1", the bus 316 is discharged in accordance with the content CNT (cf. FIG. 11(j)) of the specified counter/timer register, and upon completion of the discharge the data is established on the bus 316 as RBUS1 (cf. FIG. 11(c)). Namely, the content CNT of the specified counter/timer register is read out on the first I/O read bus 316. Similarly, when $\phi2$ becomes "1", the bus 317 is discharged in accordance with the content COMP of the specified compare register (cf. FIG. 11(l)), and when the discharge is completed, the data is established on the bus 317 as RBUS2 (cf. FIG. 11(i)). That is, the content COMP of the specified compare register is read out on the second I/O read bus 317.

The data RBUS1 on the bus 316 is taken into the first source latch 306 to become the data SLX, during $\phi2$ assumes "1" (cf. FIG. 11(d)). At the same time, the data RBUS2 on the bus 317 is taken into the second source latch 307 to become the data SLY (cf. FIG. 11(e)). The AU 308, which is in the precharge state during $\phi2$ is "1", is provided with the data SLX from the first source latch 306 to its terminal A and with the data SLY from the second source latch 307 to its terminal B, during $\phi1$ assumes "1" (cf. FIG. 11(f)). The AU 308 compares SLX and SLY to produce the comparison output OUT (cf. FIG. 11(m)). This output OUT is led to one of the output latches 310 specified by a task microinstruction to become a pulse output signal of the I/O pulse processing apparatus 10.

Six kinds of the basic I/O processing operations, i.e., FRC, GCC, UDC, RES, CPT and CMP, have been described above. According to the inventors' study, such six basic I/O processing operations as described above were sufficient for performing a considerably complicated I/O processing task, which is usually required for an I/O pulse processing apparatus associated with a microcomputer for controlling various devices or apparatuses. In the following, the description will be made of an example of such a complicated I/O processing task.

Figure 12:
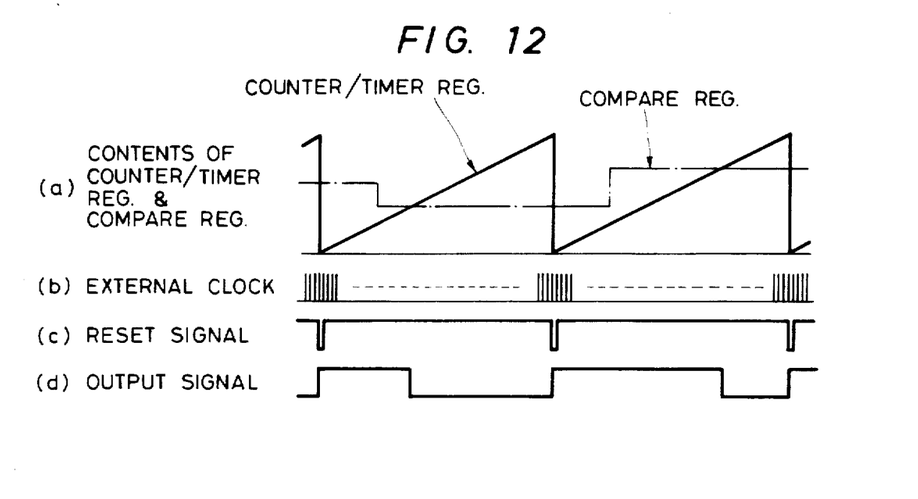
FIG. 12 is a diagram for explaining the operation of an example of tasks required by a microcomputer, which are completed by the combination of some of the basic I/O processing operations as shown in the foregoing figures.

Here let us consider a task of controlling the pulse width of output pulses as an example of I/O processing tasks. The outline of the operation of this task is shown in FIG. 12. Namely, as shown in FIG. 12(a), a register specified by a task microinstruction as a counter/timer register counts an external clock as shown in FIG. 12(b) to increase its content. The content of the specified counter/timer register is reset at every reset signals (cf. FIG. 12(c)), which occur at a constant period. Further, the content of the specified counter/timer register is compared with a reference data (cf. FIG. 12(a)) stored in another register specified by another task microinstruction as a compare register, and an output pulse signal as shown in FIG. 12(d) is produced on the basis of the comparison result.

Figure 13A:
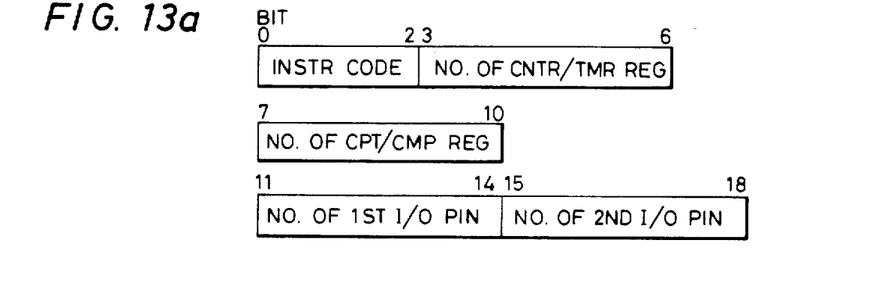
FIGS. 13a and 13b show a format and examples of task microinstructions employed in the embodiment of FIG. 2.

Before explanation of the operation, the format of a task microinstruction and examples thereof will be described, referring to Figs. 13a and 13b. In this embodiment, each task microinstruction, as shown in FIG. 13a, is formed of 19 bits and includes a task instruction code for specifying one of the basic I/O processing operations as described above (0 bit to 2nd bit), an area for the number of a register to be specified as a counter/timer register (3rd bit to 6th bit), an area for the number of a register to be specified as either a capture register or a compare register (7th bit to 10th bit), an area for specifying the number of a pin to be used as a first I/O pin (11th bit to 14th bit), and an area for specifying the number of another pin to be used as a second I/O pin (15th bit to 18th bit).

The task microinstructions for performing the basic I/O processing operations of the six kinds as mentioned earlier are coded as follows.

| Processing Operation | Code of Microinstruction |
| --- | --- |
| F R C | 0 0 1 |
| G C C | 0 1 0 |
| U D C | 0 1 1 |
| R E S | 1 0 0 |
| C P T | 1 0 1 |
| C M P | 1 1 0 |

Further, the first I/O pin is specified, in the task microinstructions for FRC, GCC and UDC, as an input terminal of the external clock. In the task microinstruction for RES, this pin is specified as an input terminal of the reset signal. The second I/O pin is specified, in the task microinstructions for GCC, UDC, CPT and CMP, as input terminals of the gate control signal in GCC, the up-down control signal in UDC and the sampling signal in CPT, and as an output terminal in CMP.

Figure 13B:
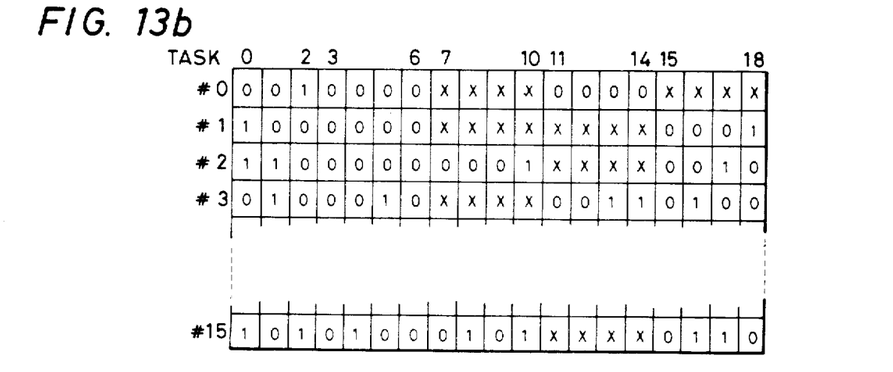

An example of a set of actual task microinstructions for the basic I/O processing operations is shown in FIG. 13b. In this example, the task microinstructions, which are formed of the different combination of the microinstruction codes and the numbers of the registers as well as the I/O pins, are identified by task numbers from 0 to 16. The task microinstruction of the task #0 is for FRC (cf. "001" in bits 0 to 2), by which the register #0 (cf. "0000" in bits 3 to 6) of the register group 305 (FIG. 2) is specified as a counter/timer register and the specified register counts the external clock supplied through the pin #0 (cf. "0000" in bits 11 to 14). The task #1 is for RES (cf. "100" in bits 0 to 2), by which the register #0 (cf. "0000" in bits 3 to 6) specified as a counter/timer register is reset by the reset signal supplied through the pin #1 (cf. "0001" in bits 11 to 14). The task #2 is for CMP (cf. "110" in bits 0 to 2), by which the content of the register #0 (cf. "0000" in bits 3 to 6) specified as a counter/timer register is compared with the content of the register #1 (cf. "0001" in bits 7 to 10) specified as a compare register and the result of comparison is sent to the pin #2 (cf. "0010" in bits 15 to 18) as an output.

Similarly, the task #3 is for GCC (cf. "010" in bits to 2), by which the register #2 (cf. "0010" in bits 3 to 6) specified as a counter/timer register counts an external clock given through the pin #3 (cf. "0011" in bits 11 to 14), only when the gate signal is supplied through the pin #4 (cf. "0100" in bits 15 to 18). The task #15 is for CPT (cf. "101" in bits 0 to 2), by which the content of the register #4 (cf. "0100" in bits 3 to 6) specified as a counter/timer register is held by the register #5 (cf. "0101" in bits 7 to 10) specified as a capture register, every time the sampling signals are applied through the pin #6 (cf. "0110" in bits 15 to 18).

Returning now to the example of FIG. 12, it will be understood that the processing operation of this example is made up of three basic I/O processing operations, i.e., FRC, RES and CMP. When the microcomputer unit 20 is initialized, the CPU 200 selects the task microinstructions for FRC, RES and CMP as necessary task microinstructions for completing the task exampled in FIG. 12, and sends them to the I/O pulse processing apparatus 10 through the data bus 103. These task microinstructions are stored in the task registers 303 and successively read out under the control of the task signal generator 301 and the task address decoder 302. In this embodiment, the three task microinstructions for FRC, RES and CMP are executed one after another on a time-sharing basis to perform the desired I/O processing task required by the microcomputer unit 20.

In the example described above, three task microinstructions were initially given to the I/O pulse processing apparatus 10 from the microcomputer unit 20. Since, however, in the embodiment of FIG. 2, sixteen task registers 303 are provided in the I/O pulse processing apparatus 10, the same number of the task microinstructions can be stored therein, whereby it becomes possible to perform the more complicated I/O processing task. Further, it is of course that the number of the task registers to be provided is not limited.

As described above, according to the present invention, the number of counter/timer registers and the number of capture registers or compare registers are not fixed, but they can be freely specified by task microinstructions. Accordingly, the I/O pulse processing apparatus of the present invention is available for various microcomputers for controlling various devices or apparatuses. Further, since necessary I/O pins are also specified by task microinstructions, the limited number of I/O pins, as in a single-chip microcomputer, can be used effectively. Moreover, once the combination of task microinstructions necessary for completing an I/O processing task has been determined by the microcomputer, which needs the task, the execution of the task microinstructions is managed by the I/O pulse processing apparatus, whereby the load of the microcomputer can be decreased.

Although we have herein shown and described only one form of apparatus embodying our invention, it is understood that various changes and modifications may be made therein within the scope of the appended claims without departing from the spirit and scope of our invention.

I claim:

1. An input/output pulse processing apparatus having a plurality of input/output (I/O) pins, coupled to a microcomputer through buses for processing pulses in accordance with a task required by the microcomputer, said apparatus comprising:

I/O task register means having a task register group consisting of a plurality of task registers, each of which store a task microinstruction supplied from the microcomputer through said buses, said microinstructions being necessary for executing a task required by the microcomputer, and an address signal generator for counting an internal clock and producing address signals for accessing the task register group on the basis of the counting result, wherein the task microinstructions are read out successively from the task register group to execute the task required by the microcomputer in accordance with said counting result; wherein each of the task microinstructions includes an instruction code specifying one of a plurality of basic I/O processing operations, a code for specifying at least one register necessary for executing a basic I/O processing operation and a code for specifying at least one of the I/O pins, through which an input signal is taken into or an output signal is delivered from said I/O pulse processing apparatus, and wherein the task required by the microcomputer is completed by a combination of task microinstructions selected and supplied by the microcomputer;

task decoding means connected to said I/O task register means for receiving the successively read-out task microinstructions and for producing control signals by decoding the read-out task microinstructions;

I/O operation means, controllably coupled to said task decoding means, including a register group made up of a plurality of registers, each of which is capable of being specified by control signals produced as the basis of a read-out task microinstruction and performing a register function necessary for the execution of the basic I/O processing operation specified by an instruction code of the read-out task microinstruction, and an arithmetic unit connected to the register group through internal buses for performing an arithmetic operation on the basis of data from the specified registers in accordance with the control signals produced by decoding the read-out task microinstruction in said task decoding means; and I/O pin selector means selecting at least one of the I/O pins and connecting the selected pin with said task decoding means or said I/O operation means, under control of the control signals produced on the basis of a pin specifying code of the read-out task microinstruction.

2. An input/output pulse processing apparatus as defined in claim 1, wherein the basic I/O processing operation includes a free running counter/timer operation, in which the contents of one of the registers of said I/O operation means, which is specified by the read-out task microinstruction as a counter/timer, increments in accordance with an external clock or the internal clock, whereby the contents of said specified register is utilized as a counter timer.

3. An input/output pulse processing apparatus as defined in claim 2, wherein the external clock or the internal clock is counted by the specified register, only when a gate control signal, externally supplied through an I/O pin specified by the read-out task microinstruction, exists.

4. An input/output pulse processing apparatus as defined in claim 1, wherein the basic I/O processing operation includes an up-down counter/timer operation, in which one of the registers of said I/O operation means, which is specified by the read-out task microinstruction as a counter/timer, counts an external clock or the internal clock to increase the content thereof upon existence of an up-counting control signal and to decrease the content thereof upon existence of a down-counting control signal; the up-counting signal and the down-counting control signal being externally supplied through an I/O pin specified by the read-out task microinstruction.

5. An input/output pulse processing apparatus as defined in claim 1, wherein the basic I/O processing operation includes a reset operation, in which the content of one of the registers of said I/O operation means, which is specified by the read-out task microinstruction as a counter/timer, is maintained at a previous value when no reset signal exists, and changed to a predetermined reset value, when a reset signal occurs; the reset signal being externally supplied through an I/O pin specified by the read-out microinstruction.

6. An input/output pulse processing apparatus as defined in claim 1, wherein the basic I/O processing operation includes a capture operation, in which, when a sampling signal is externally supplied through an I/O pin specified by the read-out microinstruction, the content of one of the registers of said I/O operation means, which is specified by the read-out task microinstruction as a counter/timer, is transferred to another register of said I/O operation means, which is specified by the read-out task microinstruction as a capture register.

7. An input/output pulse processing apparatus as defined in claim 1, wherein the basic I/O processing operation includes a compare operation, in which the content of one of the registers of said I/O operation means, which is specified by the read-out task microinstruction as a counter/timer, is compared with the content of another register of said I/O operation means, which is specified by the read-out task microinstruction as a compare register, and an output is produced on the basis of the comparison result.

* * * * *

UNITED STATES PATENT AND TRADEMARK OFFICE
CERTIFICATE OF CORRECTION

PATENT NO. :   4,809,165

DATED      :   February 28, 1989

INVENTOR(S) :  Shigeki MORINAGA & Mitsuru WATABE

It is certified that error appears in the above-identified patent and that said Letters Patent is hereby corrected as shown below:

On the face of the patent, in the left-hand column thereof, delete

"[75]   Inventor:  Shigeki Morinaga, Hitachi, Japan"

and substitute therefor the following:

-- [75]   Inventors:  Shigeki MORINAGA, Mitsuru WATABE, Hitachi, Japan --

Item [19], "Morinaga" should read --Morinaga et al--.

Signed and Sealed this
Twenty-sixth Day of December, 1989

*Attest:*

JEFFREY M. SAMUELS

*Attesting Officer*     *Acting Commissioner of Patents and Trademarks*